United States Patent
Zúñiga Sagredo

(10) Patent No.: US 8,141,820 B2
(45) Date of Patent: Mar. 27, 2012

(54) OPTIMIZED AIRCRAFT MANHOLE

(75) Inventor: Juan Zúñiga Sagredo, Madrid (ES)

(73) Assignee: Airbus Espana, S.L., Madrid (ES)

( * ) Notice: Subject to any disclaimer, the term of this patent is extended or adjusted under 35 U.S.C. 154(b) by 861 days.

(21) Appl. No.: 12/072,691

(22) Filed: Feb. 27, 2008

(65) Prior Publication Data

US 2009/0166473 A1   Jul. 2, 2009

(30) Foreign Application Priority Data

Dec. 27, 2007   (ES) .................................. 200703453

(51) Int. Cl.
*B64C 1/14* (2006.01)

(52) U.S. Cl. .................................. 244/129.4; 244/129.5

(58) Field of Classification Search ............... 244/129.4, 244/119, 120, 121, 129.3, 129.5
See application file for complete search history.

(56) References Cited

U.S. PATENT DOCUMENTS

| | | | | | |
|---|---|---|---|---|---|
| 2,293,656 | A | * | 8/1942 | McClain ......................... 52/208 |
| 2,473,616 | A | * | 6/1949 | Stephenson ................ 244/129.3 |
| 2,576,734 | A | * | 11/1951 | Voelker ......................... 52/309.2 |
| 3,429,530 | A | * | 2/1969 | Hertel ........................ 244/129.3 |
| 4,450,661 | A | * | 5/1984 | Whitener ....................... 52/206 |
| 4,669,410 | A | * | 6/1987 | Howell ........................... 114/173 |
| 4,908,254 | A | * | 3/1990 | Fischer et al. ................. 428/119 |
| 5,023,987 | A | * | 6/1991 | Wuepper et al. ........... 29/402.11 |
| 5,084,120 | A | * | 1/1992 | Fischer et al. ................ 156/233 |
| 5,452,867 | A | * | 9/1995 | Grunwald et al. ......... 244/117 R |
| 5,491,936 | A | * | 2/1996 | Logan et al. ..................... 52/105 |
| 6,889,938 | B1 | * | 5/2005 | Nordman .................... 244/129.3 |
| 6,915,987 | B2 | * | 7/2005 | Fisher et al. ............... 244/129.3 |
| 7,028,950 | B2 | * | 4/2006 | Salmon et al. ............ 244/129.3 |
| 7,281,686 | B2 | * | 10/2007 | Wood ......................... 244/129.3 |
| 7,503,524 | B2 | * | 3/2009 | Fournie et al. ............. 244/129.4 |
| 7,556,220 | B2 | * | 7/2009 | Schulz ....................... 244/129.4 |
| 7,578,474 | B2 | * | 8/2009 | Balsillie et al. ............ 244/129.3 |
| 2005/0121554 | A1 | * | 6/2005 | Fournie et al. ................ 244/119 |
| 2008/0067288 | A1 | * | 3/2008 | Eberth et al. ............... 244/129.3 |
| 2008/0169380 | A1 | * | 7/2008 | Jackson et al. ............ 244/129.3 |
| 2008/0169381 | A1 | * | 7/2008 | Ostrem et al. ............. 244/129.3 |
| 2009/0230246 | A1 | * | 9/2009 | Depeige et al. ............ 244/129.3 |
| 2009/0294591 | A1 | * | 12/2009 | Ramirez Blanco et al. .......................... 244/129.4 |
| 2010/0108812 | A1 | * | 5/2010 | Boursier et al. ........... 244/129.3 |

* cited by examiner

*Primary Examiner* — Timothy D Collins
*Assistant Examiner* — Steven Hawk
(74) *Attorney, Agent, or Firm* — Ladas & Parry LLP

(57) ABSTRACT

An aircraft manhole including a skin panel of an aircraft structure, wherein an outer door and an inner door of the aircraft manhole are positioned on the skin panel. The aircraft manhole further includes stringers installed on the skin panel positioned on and attached to the skin, and fixing edges partially projecting through the manhole on the side for positioning the outer door and the inner door. The aircraft manhole also includes reinforcements arranged between the outer door and the inner door of the manhole that are attached to the skin, the reinforcements forming the fixing edges on one of its sides, and a cavity arranged in the skin to allow installing the outer door, thus maintaining the aerodynamic surface of the assembly as well as its tightness.

9 Claims, 6 Drawing Sheets

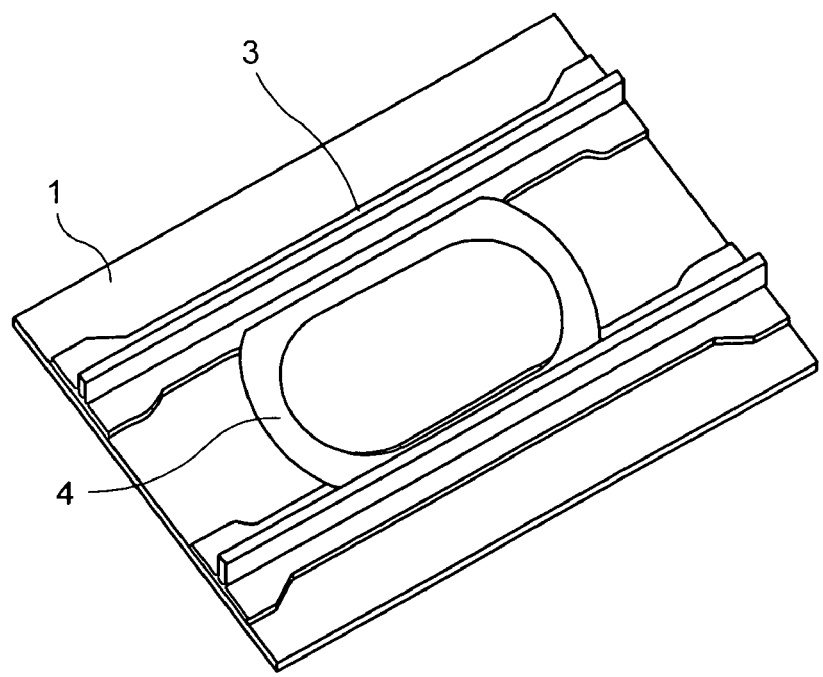
F I G. 9
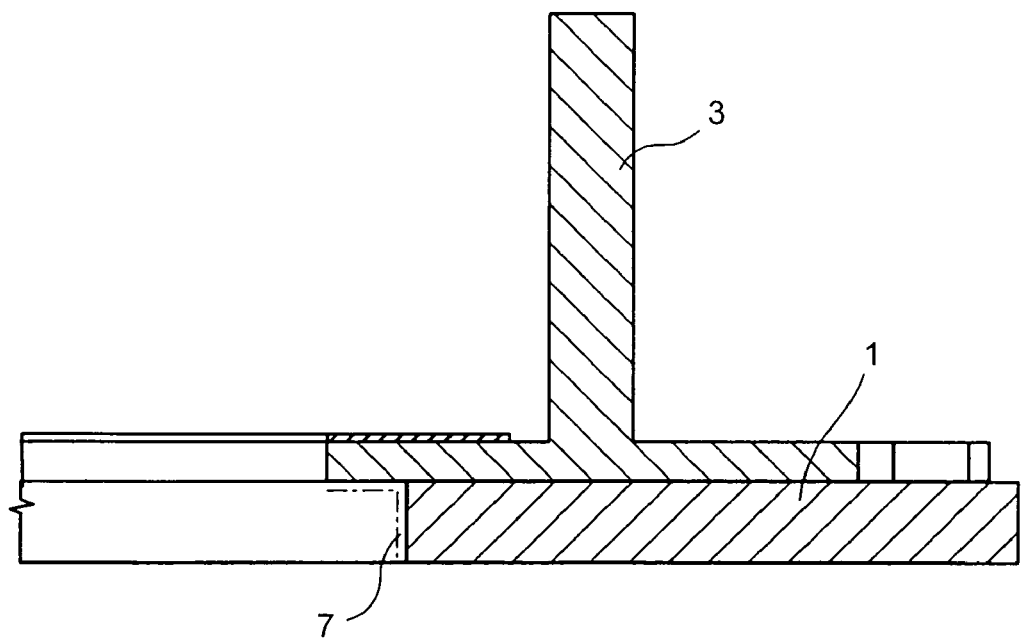
F I G. 10

OPTIMIZED AIRCRAFT MANHOLE

FIELD OF THE INVENTION

The present invention relates to a manhole for an aircraft structure made from a composite material.

BACKGROUND OF THE INVENTION

The openings in aircraft skins are usually referred to as manholes, while the covers of these openings are commonly referred to as manhole covers or doors. Therefore, manholes and the covers or doors in aeronautical structures are a very widespread practice required for both assembly and subsequent maintenance and inspection tasks throughout the entire lifetime of the aircraft.

Aircraft access requirements may vary depending on the kind or type of access needed as well as on the frequency of its use.

Generally any structure in the aircraft comprising a hole or opening requires reinforcement to counteract the effect of the mentioned opening.

Access to fuel tanks is necessary in aeronautical structures. For the particular case of aircraft wings and stabilizers, this access is typically through manholes, and such manholes must meet the following requirements:

the size must be in accordance with accessibility requirements;
the door or cover must be sealed for the purpose of preventing fuel loss;
impact requirements must be met;
the assembly and disassembly of doors or covers must be as quick and as easy as possible;
the doors or covers must be changeable.

There are different known solutions for this type of door or cover and manhole that are currently used in aircraft stabilizer and wing structures. These elements are generally arranged in the lower skins of stabilizer and wing structures.

Manholes typically used in horizontal stabilizers differ from the generally used concept for the same manhole doors in the metal skins on wings.

Therefore one of the known solutions used for metal aircraft structures typically used in the lower skins on aerodynamic surface wings consists of an opening with suitable dimensions in which two separate covers or doors are located, one inside the fuel tank and the second one on the aerodynamic surface, screwed together such that they secure the panel of skin between them. To maintain the aerodynamic surface, a cavity is machined on the outer surface of the skin to install the outer cover or door.

Both parts are screwed together to close the cover or door. The resulting pressure on the surrounding surface seals the door through the action of sealing profiles.

However the solution currently used for manholes for aircraft structures made of carbon fiber differs from the solution described above. Metal and carbon fiber have different properties. Carbon fiber furthermore has a much lower capacity for machining than metal does, and therefore the cavity machined on the metal skin described above is a very complex process for skins made from carbon fiber.

This leads to a different concept of manhole that does not require machining cavities in the skin. In addition this also prevents the skin from being perforated in several positions for installing the screws that will close the cover or door of the aircraft manhole.

This known type of cover or door comprises the following elements:

an inner cover screwed to the skin with countersunk head screws; a sealing profile between the cover and the spacer ring is generally necessary to prevent losses;
a spacer ring attached to the inner face of the skin to obtain a suitable flat surface for correct positioning of the cover;
an outer plate screwed to the inner cover giving the assembly a suitable aerodynamic surface;
pigtails for electric coupling.

This type of known cover for aircraft structures made from a composite material present sealing and tightness problems and are not suitable when these conditions are extreme. Furthermore they are not viable when the stringers of the structure are arranged very close together, which is a very common requirement in current aircraft design. These known covers particularly present problems when they must be arranged on surfaces on which stringers are supported when these surfaces must have a smooth profile and thicknesses with no sudden changes.

The present invention aims to meet these demands.

SUMMARY OF THE INVENTION

The present invention therefore relates to an aircraft manhole or access opening that allows placing thereon a clamp-type airtight fixing door. The object of the invention is therefore a new concept of skin structure around conventional manhole covers or doors mainly used in aircraft stabilizer and wing structures made of a composite material, typically in fuel tank areas, such that they allow full access (for the entire body of a person or operator) to the inner structure of the component in question.

The aircraft manhole according to the invention, said manhole comprising a skin panel of the aircraft structure made of a composite material, particularly carbon fiber, an outer door and an inner door of the aircraft manhole being positioned on the mentioned skin panel, comprises stringers that are positioned on and attached to the skin. The edges of the feet of the stringers project such that the two lids forming the door are clamped on the foot of the stringer. The actual thickness of the skin functions as a mortise so that the outer lid does not project and the aerodynamic profile is thus maintained.

Other features and advantages of the present invention will be understood from the following detailed description of an illustrative embodiment of its object in relation to the attached figures.

DESCRIPTION OF THE DRAWINGS

FIG. 9 shows a detail of the reinforcements covering the stringers forming the fixing edge for an aircraft manhole cover according to the invention.

FIG. 10 shows a detail of the resulting cavity in the skin panel of the aircraft manhole according to the invention.

DETAILED DESCRIPTION OF THE INVENTION

Figure 1:
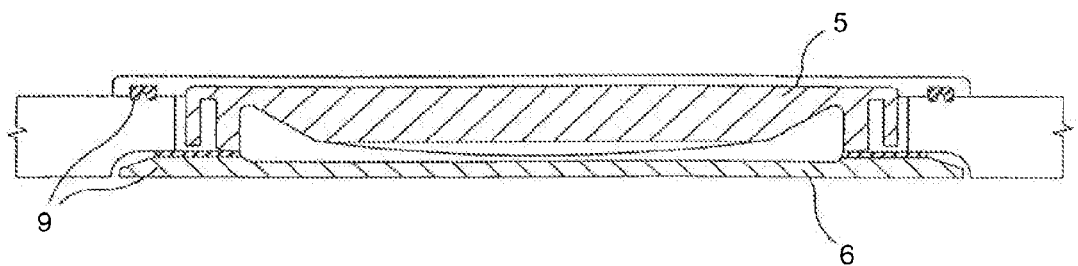
FIG. 1 shows a diagram of an aircraft manhole cover in a metallic structure according to the known art of the clamp-type door.
Figure 2:
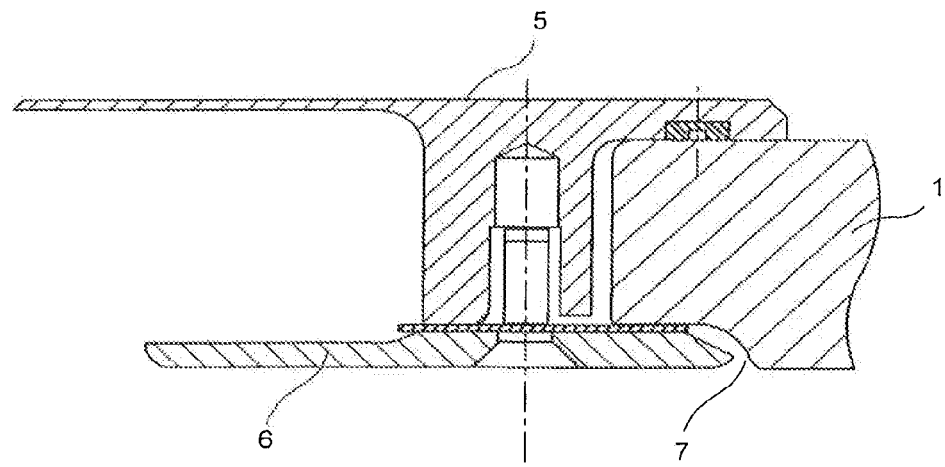
FIG. 2 shows a detail of the installation of an aircraft manhole cover in a metallic structure according to the known art of the clamp-type door.
Figure 3:
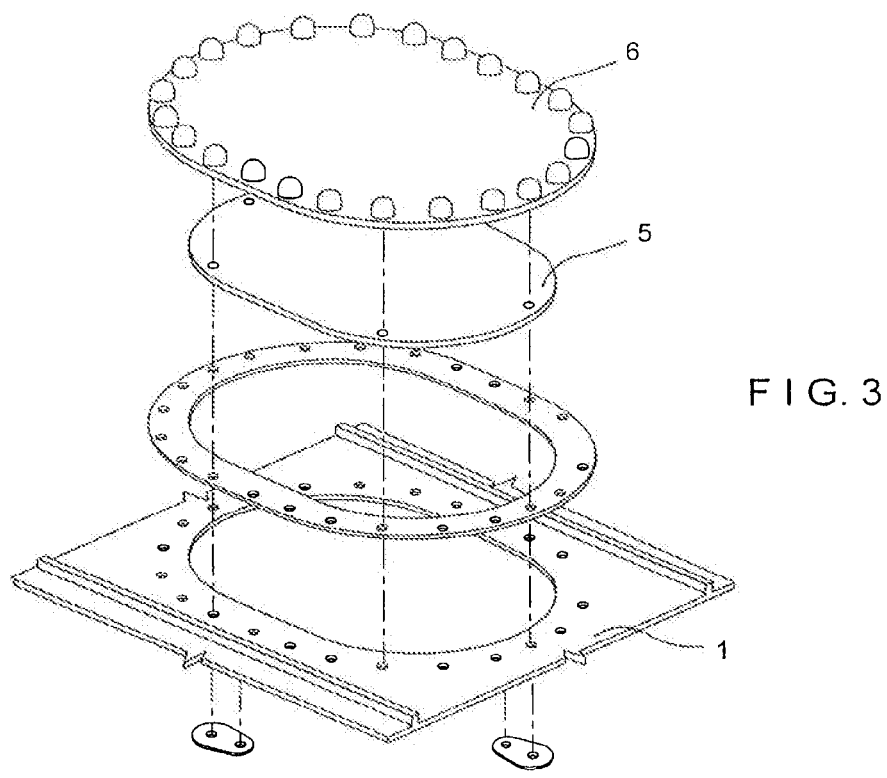
FIG. 3 shows a diagram of an aircraft manhole cover in a carbon fiber structure according to the known art of the riveted-type door.
Figure 4:
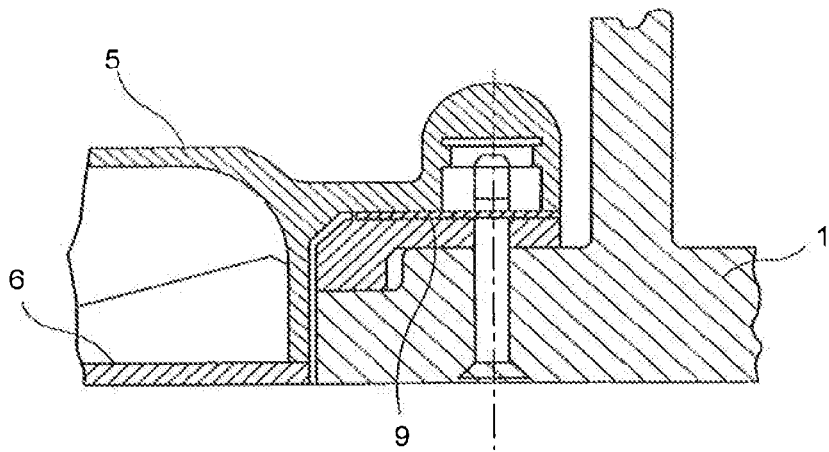
FIG. 4 shows a detail of the installation of an aircraft manhole cover in a carbon fiber structure according to the known art of the riveted-type door.
Figure 5:
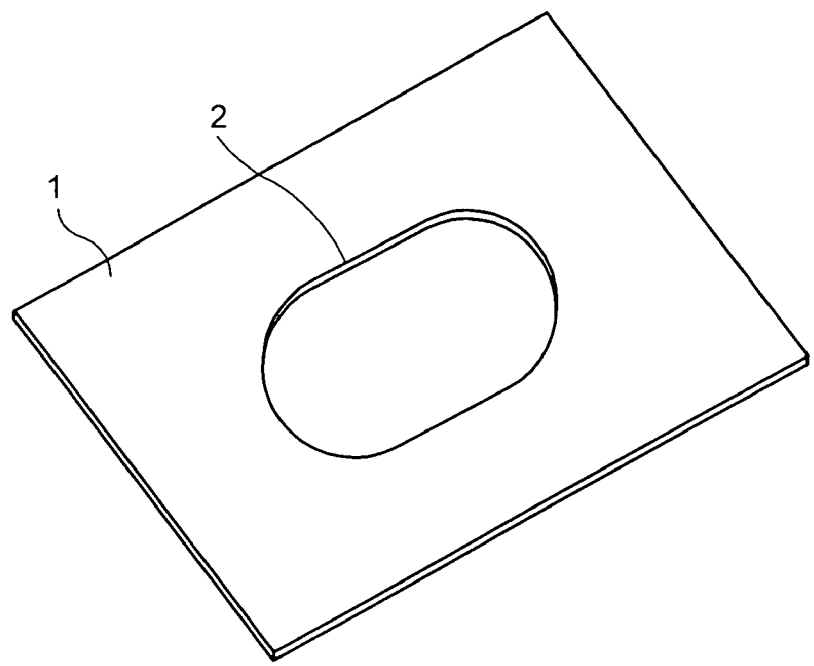
FIG. 5 shows a detail of a skin panel trimmed for an aircraft manhole cover according to the invention.
Figure 6:
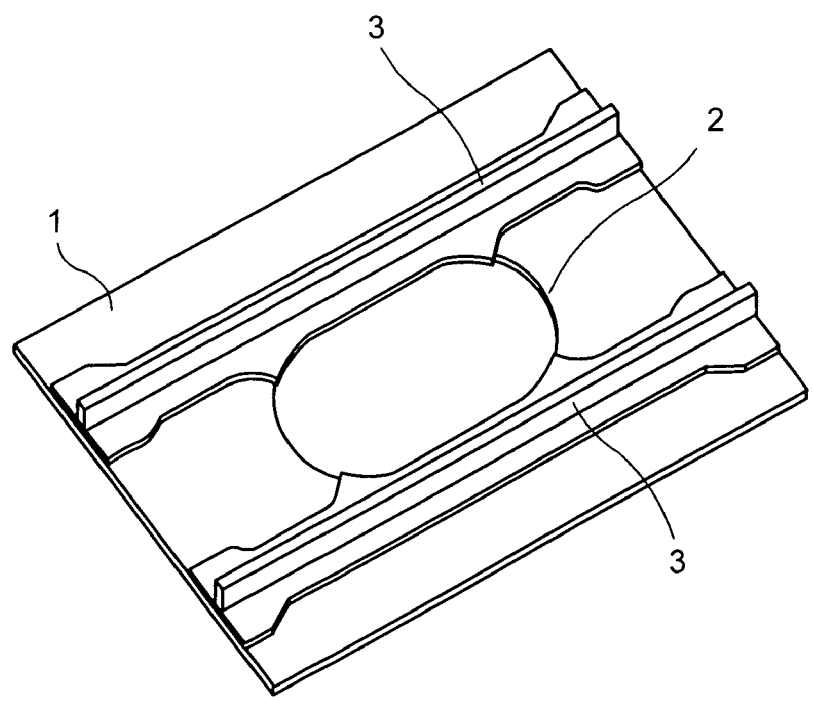
FIG. 6 shows a detail of the stringers forming the fixing edge for an aircraft manhole cover according to the invention.
Figure 7:
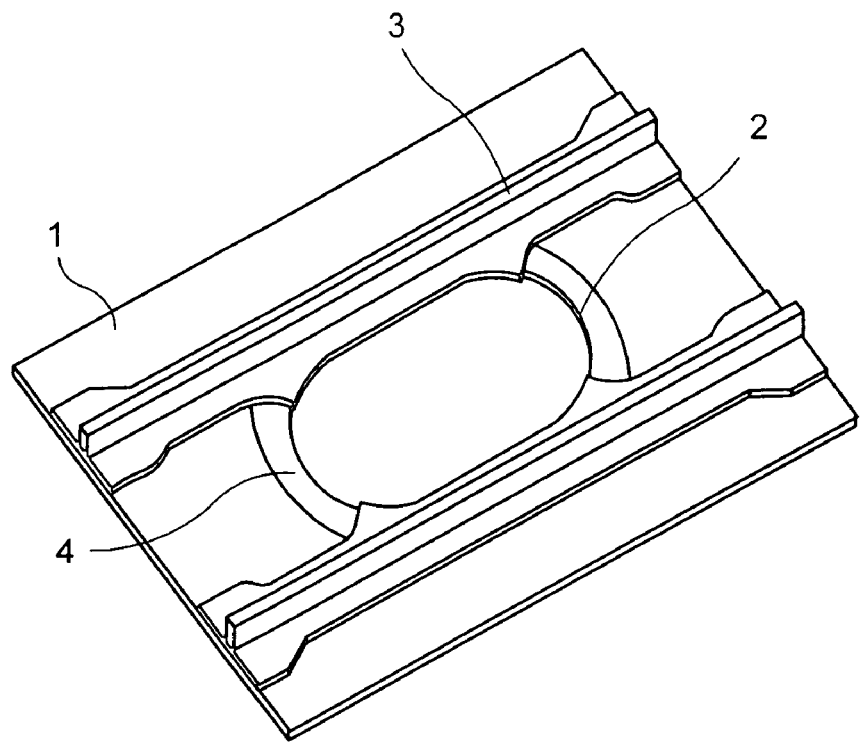
FIG. 7 shows a detail of the reinforcements completing the fixing edge for an aircraft manhole cover according to the invention.
Figure 8:
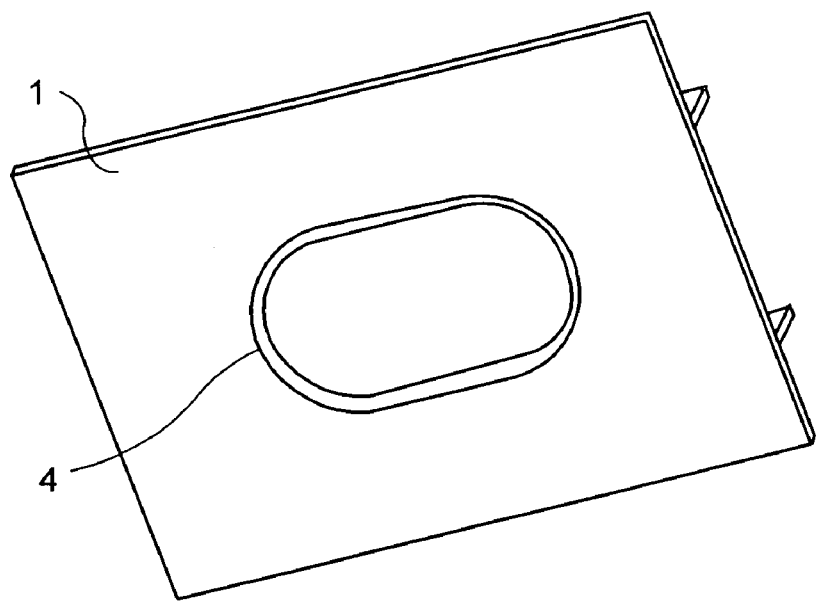
FIG. 8 shows a detail of the view from outside an aircraft manhole with a cover according to the invention.

The invention relates to an aircraft manhole cover, said manhole comprising a skin panel 1 of the aircraft structure made from a composite material, particularly carbon fiber, on which the access hole is made. Stringers 3 are positioned on the mentioned skin panel 1, and arranged on such stringers through the fixing edges 8 are an outer door 6 and an inner door 5 of the aircraft manhole. Reinforcements 4 are additionally located on the skin 1 to offer uniform support to the lids 5 and 6, the latter lid 6 being housed in the cavity formed by the skin while at the same time maintaining the aerodynamic surface of the assembly as well as its tightness.

The concept of a clamp-type fixing door or cover for an aircraft manhole described above can be used for both metallic structures and for structures made from composite materials. Therefore the design presented by the invention comprises a panel structure 1 which is compatible with the concept of a fixing door or cover, while at the same time composite material structures, mainly carbon fiber structures, are possible without needing any machining operations. Sealing elements 9 can also be added depending on the necessary requirements in each case.

Stabilizers or wing panels 1 for aircraft structures typically comprise stringers 3 attached to the skin, the skin being thus shaped.

According to the invention the cavity 7 is not machined in the skin 1 given that it is a very complex process. The cavity is made by placing inserts in the curing mold on which the laminate is located before the curing process.

The skin 1 is trimmed according to 2, such that the outer door 6 of the aircraft manhole fits in said trim 2 of the skin 1.

Therefore according to the design of the present invention, the outer door 6 of the manhole is not fixed to the skin panel 1 but is fixed to the stringers 3 and to the reinforcements 4 in the areas where there are no stringers 3.

In addition the mentioned side reinforcements 4 are made such that they cover the stringers 3 in a way that a uniform surface leading to a better seal is generated.

The stringers 3 are typically attached to the skin 1, but in the event that the manhole structure needs specific rigidity against impacts, the stringers 3 and reinforcements 4 can be riveted into the aircraft structure.

The skin panel 1 in the aircraft manhole proposed by the invention can be made of a composite material, mainly carbon fiber, or it can be metallic.

Figure 11:
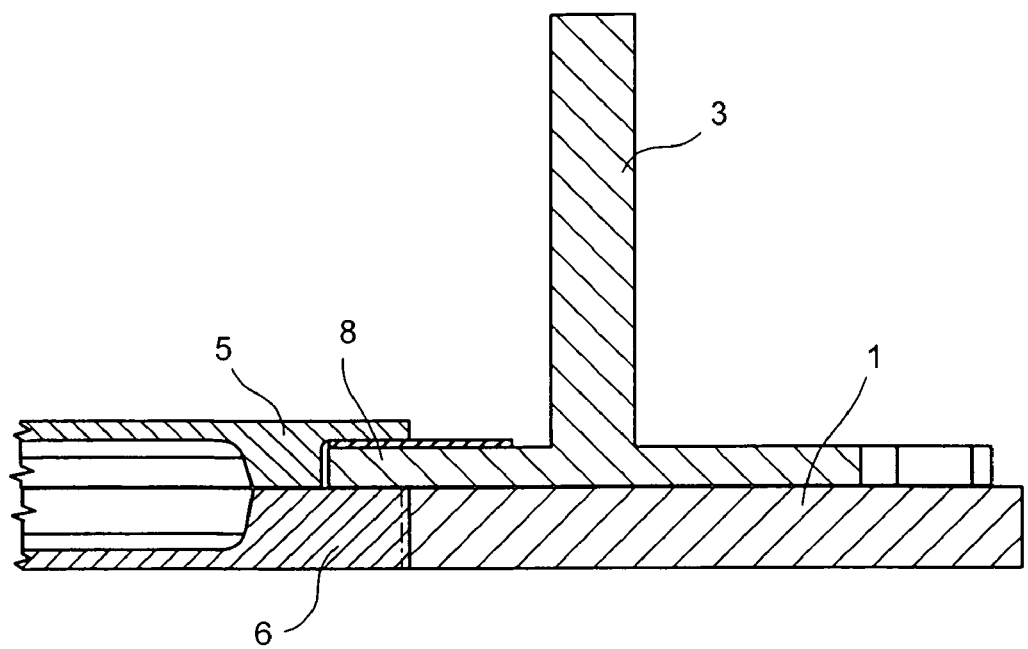
FIG. 11 shows a detail of the aircraft manhole cover according to the invention fixing the structure of the skin of the aircraft.
Figure 12:
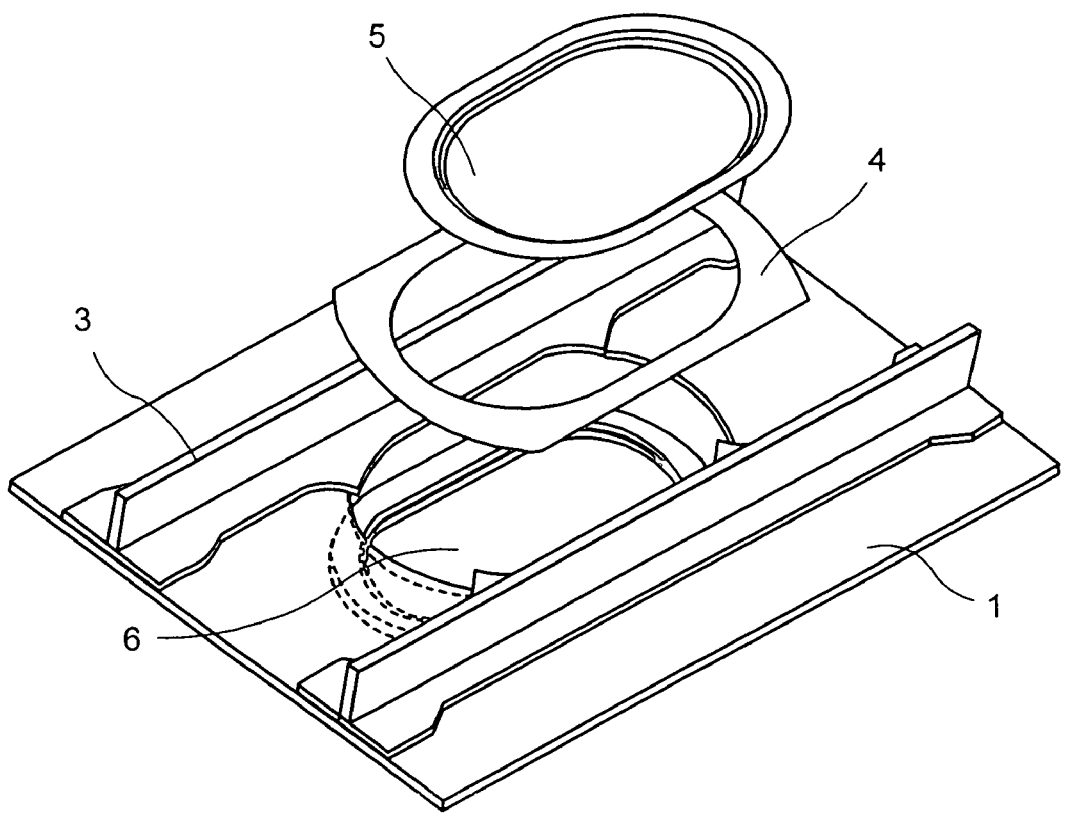
FIG. 12 shows an exploded view of the aircraft manhole cover according to the invention.

An additional advantage of this manhole configuration according to the invention is that the stringers 3 are very close to the edge or end of the opening in the skin 1, such that they very efficiently reinforce the mentioned opening in the skin 1, as can be seen in FIGS. 10 and 11.

Any modifications comprised within the scope defined by the following claims can be introduced in the embodiments that have just been described.

The invention claimed is:

1. An aircraft manhole assembly comprising a skin panel (1) of an aircraft structure, wherein an outer cover (6) and an inner cover (5) of the aircraft manhole assembly are positioned on the skin panel (1), said aircraft manhole assembly comprising:

stringers (3) installed on the skin panel (1) positioned on and attached to the skin panel (1);

fixing edges (8) partially projecting through the manhole on the side for positioning the outer cover (6) and inner cover (5);

reinforcements (4) arranged between the outer cover (6) and the inner cover (5) and being attached to the skin panel (1), the reinforcements (4) forming the fixing edges (8) on one of its sides; and a cavity (7) arranged in the skin panel (1) to allow installing the outer cover (6), thus maintaining an aerodynamic surface of the aircraft manhole assembly as well as tightness of the aircraft manhole assembly, wherein the outer cover (6) of the manhole is fixed to the stringers (3) and to the reinforcements (4) in areas where there are no stringers (3).

2. The aircraft manhole assembly according to claim 1, wherein the skin panel (1) is made from a composite material.

3. The aircraft manhole assembly according to claim 2, wherein the skin panel (1) is made from carbon fiber.

4. The aircraft manhole assembly according to claim 1, wherein the skin panel (1) is metallic.

5. The aircraft manhole assembly according to claim 1, further comprising sealing between the outer cover (6) and the inner cover (5).

6. The aircraft manhole assembly according to claim 1, wherein the skin panel (1) is trimmed to form a trim (2) such that the outer cover (6) of the aircraft manhole fits in the trim (2).

7. The aircraft manhole assembly according to claim 1, wherein the reinforcements (4) are made such that they cover the stringers (3), thus generating a uniform surface leading to a better seal.

8. The aircraft manhole assembly according to claim 1, wherein the stringers (3) and the reinforcements (4) are riveted into the aircraft structure.

9. The aircraft manhole assembly according to claim 1, wherein the stringers (3) are located adjacent to an edge or end of the opening in the skin panel (1), such that the stringers (3) reinforce the opening in the skin panel (1).

* * * * *